United States Patent
Lopez et al.

[11] Patent Number: 5,859,697
[45] Date of Patent: Jan. 12, 1999

[54] FIBER OPTIC NOISE SUPPRESSOR

[75] Inventors: Marco Lopez, Villa Park, Calif.; Peter E. Carnvale, Sonita, Ariz.; Hoai X. Le, Montebello, Calif.

[73] Assignee: Northrop Grumman Corporation, Los Angeles, Calif.

[21] Appl. No.: 920,048

[22] Filed: Aug. 28, 1997

[51] Int. Cl.$^6$ .................................... G01J 1/00
[52] U.S. Cl. .................. 356/213; 356/222; 356/215
[58] Field of Search .................... 356/213, 222, 356/215

[56] References Cited

U.S. PATENT DOCUMENTS

| | | | |
|---|---|---|---|
| 3,991,318 | 11/1976 | Duguay | 250/578 |
| 4,405,199 | 9/1983 | Ogle et al. | 350/96.19 |
| 4,777,663 | 10/1988 | Charlton | 455/612 |
| 5,025,148 | 6/1991 | Poisel et al. | 250/227.12 |
| 5,048,969 | 9/1991 | Deason et al. | 356/213 |
| 5,114,228 | 5/1992 | Greenfield et al. | 356/222 |
| 5,140,154 | 8/1992 | Yurek et al. | 250/227.12 |
| 5,227,857 | 7/1993 | Kersey | 365/345 |
| 5,389,544 | 2/1995 | Sugata et al. | 356/213 |

*Primary Examiner*—Frank G. Font
*Assistant Examiner*—Reginald A. Ratliff
*Attorney, Agent, or Firm*—Terry J. Anderson; Karl J. Hoch, Jr.

[57] ABSTRACT

A system for the measurement of high bandwidth peak power pulses from laser sources. A laser pulse from a laser is directed onto the surface of a diffuser that replicates the pulse. A linear array of fiber optics of varying fiber length transmits the replicated pulses to a detector. The detector produces n pulses having a pulse width $\lambda$, each separated in time by a given time delay $\Delta t$ which is directly proportioned to the length of each fiber. The output of the detector is fed to a digitizing oscilloscope to produce of digitized average pulse phase output.

5 Claims, 2 Drawing Sheets

FIBER OPTIC NOISE SUPPRESSOR

BACKGROUND OF THE INVENTION

1. Field of the Invention

The present invention relates to systems for measuring radiometric peak power, and more particularly to a system employing fiber optics for measuring high bandwidth peak power pulses from laser sources.

2. Description of the Background Art

U.S. Pat. No. 3,991,318 issued Nov. 9, 1976 to Duguay entitled OPTICAL DETECTION SYSTEMS UTILIZING ORGAN ARRAYS OF OPTICAL FIBERS discloses an organ array that comprises a plurality of optical fibers each cut to a different length with the differences between functionally adjacent fibers being uniform. The fibers are arranged in a bundle so that one set of ends of the fibers is terminated in an input plane and the opposite set of ends is terminated in an output plane. Described are several embodiments utilizing the organ array including a passive spatial scanner, optical memory systems, an image converter, an optical sampling oscilloscope, and an x-y coordinate locator.

U.S. Pat. No. 4,405,199 issued Sep. 20, 1983 to Ogle et al. entitled METHOD FOR ENHANCING SIGNALS TRANSMITTED OVER OPTICAL FIBERS describes a method for spectral equalization of high frequency spectrally broadband signals transmitted through an optical fiber. The broadband signal input is first dispersed by a grating. Narrow spectral components are collected into an array of equalizing fibers. The fibers serve as optical delay lines compensating for material dispersion of each spectral component during transmission. The relative lengths of the individual equalizing fibers are selected to compensate for such prior dispersion. The output of the equalizing fibers couple the spectrally equalized light onto a suitable detector for subsequent electronic processing of the enhanced broadband signal.

U.S. Pat. No. 4,777,663, issued Oct. 11, 1988 to Charlton entitled DATA RATE LIMITER FOR OPTICAL TRANSMISSION SYSTEM discloses a dispersion transformer for limiting the data rate of an optical fiber transmission system. A transmission optical fiber, which connects a transmitter and a receiver, may have a bandwidth much greater than that necessary to transmit a desired predetermined maximum data rate. The transmitted signal is connected to wavelength disperser means which spatially separates the different wavelength components of the transmitted signal.

Each wavelength component is then propagated with a different delay by optical fiber delay means. The wavelength component which propagates with the least delay through the transmission optical fiber is subjected to the least induced delay in the optical fiber delay means and that which propagates with the greatest delay through the transmission optical fiber is subjected to the greatest induced delay in optical fiber delay means, the remaining components being subjected to intermediate delays. The delayed wavelength components are combined to form a series of broadened optical pulses.

U.S. Pat. No. 5,025,148 issued Jan. 18, 1991 to Poisel et al. entitled LASER WARNING SENSOR WITH FREQUENCY-CODED POSITION INFORMATION discloses a laser warning sensor having a directional resolution capability based on a pulse frequency encoding of the directions at which laser light beams are received. The sensor is equipped with a plurality of light signal delay units. The directional or angular information is encoded by closed loop fiberglass light conductors, one of which is part of each light signal delay unit, each closed loop has a different length so that the respective signal delay signifies the respective directional information. The closed loop light conductors transform received light pulse signals into pulse sequences or pulse trains each having a given frequency. The respective frequencies are separated by filters in an electronic evaluating circuit which receives its input signals from a photodiode which receives the output light signals from all delay units.

U.S. Pat. No. 5,140,154 issued Aug. 18, 1992 to Yurek et al. entitled INLINE FIBER OPTIC SENSOR ARRAYS WITH DELAY ELEMENTS COUPLED BETWEEN SENSOR UNITS discloses an improved inline fiber optic sensor array that is achieved by packaging a plurality of fiber optic sensor units such that each fiber optic sensor unit incorporates a complete functional sensor and adjacent fiber optic sensor units are separated by a delay element connected in series between each pair of fiber optic sensor units. Delay elements temporally separate measured signals received from the individual fiber optic sensor units and permit decoupling of signals produced in response to environmental stress on the non-sensor unit portions of the array.

U.S. Pat. No. 5,227,857 issued Jul. 13, 1993 to Kersey entitled SYSTEM FOR CANCELLING PHASE NOISE IN AN INTERFEROMETRIC FIBER OPTIC SENSOR ARRANGEMENT discloses a fiber optic sensor system for canceling phase noise while it senses a measureand field. The system includes circuitry for developing a light beam that is frequency modulated at a fundamental frequency. First and second unbalanced interferometers, having equal path imbalances, are responsive to the frequency modulated light beam for producing respective first and second optical outputs. Detection circuitry is responsive to the fundamental frequency, the second harmonic of the fundamental frequency, and the first and second optical outputs for producing a plurality of sine and cosine signals containing phase difference and phase noise components. A signal processor is responsive to the plurality of sine and cosine signals for canceling the phase noise components and only producing output sine and cosine components of the difference in the phase shift between the first and second unbalanced interferometers. The system can further include a demodulator for demodulating the sine and cosine components to produce an output signal proportional to the phase shift difference between the first and second unbalanced interferometers.

SUMMARY OF THE INVENTION

An object of the present invention is to provide a system to accurately reproduce a laser temporal pulse shape and measuring the peak power of the pulse.

Another object of the present invention is to provide a system for measuring the temporal characteristics of a laser pulse.

A further object of the present invention is to provide a system for measuring peak power laser pulses with high bandwidth noise cancellation.

Still another object of the present invention is to provide a measuring system using optical fibers of incrementally increasing length for reproducing a laser pulse shape while removing the effects of internal and external radiated electromagnetic interference.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms.

Like numerals to like parts throughout the disclosure.

DETAILED DESCRIPTION OF THE PREFERRED EMBODIMENT

Figure 1:
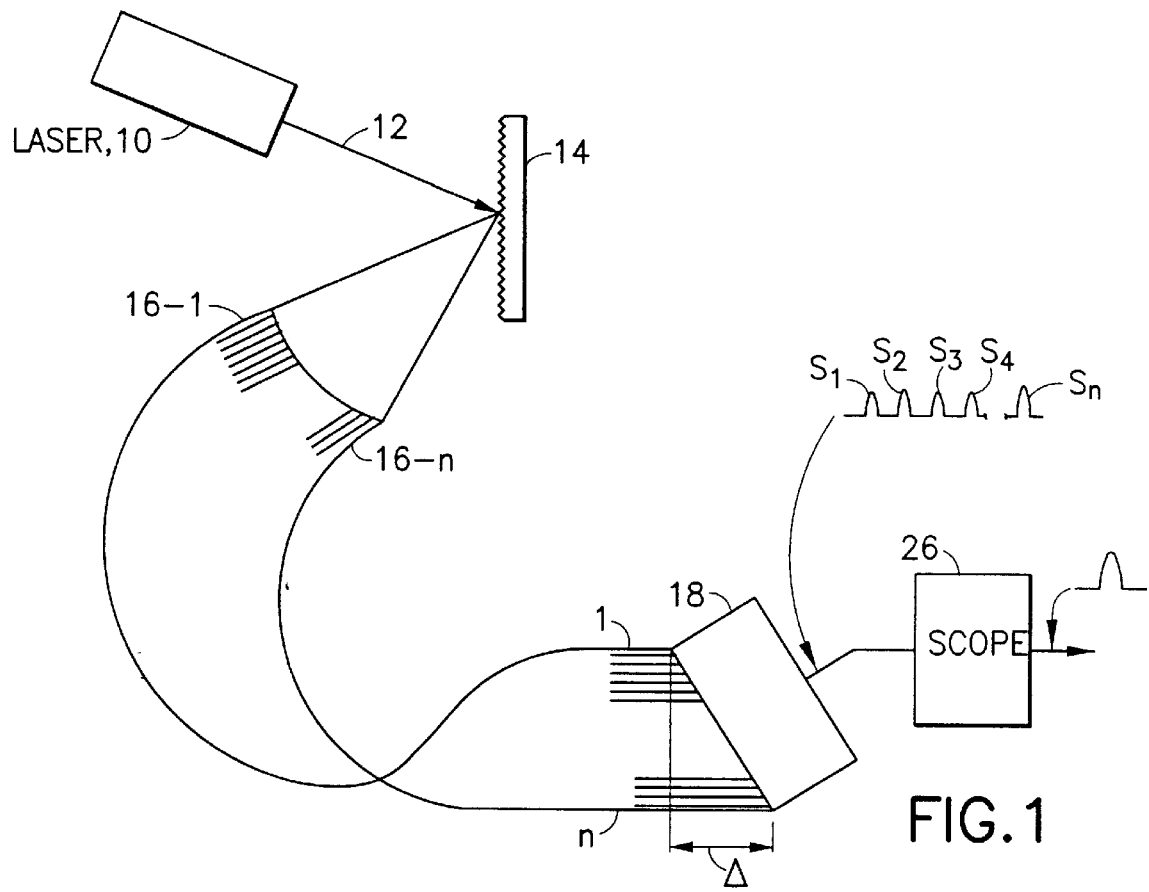
FIG. 1 is a schematic illustration of an embodiment of a system for reproducing the pulse shape and suppressing noise in the measurement of high bandwidth peak power laser pulses.

Referring to FIG. 1, an embodiment is shown of a system for the measurement of high bandwidth peak power pulses from laser sources. In measuring peak power, of such pulses, such as 20 nsec pulses, detectors and electronics must be designed to prevent temporal pulse degradation. This requirement leads to fast photodetectors (nsec rise times) and high bandwidth electronics (10–60 MHz). In developing high bandwidth electronics, it is extremely difficult to control radiated electromagnetic interference susceptibility. Consider that a measurement of a laser unit under test tends to place it in a high electromagnetic interference environment by its nature. The embodiment of the present invention shown in FIG. 1 provides a means of accurately reproducing the received pulse shape in the presence of high electromagnetic interference.

In FIG. 1, a laser pulse 12 from source 10 such as a pulsed solid state ND YAG laser operating at 1.06 μm wavelength with 100 to 1,000 millijoule output is incident onto the surface of a diffuser 14 such as a Lambertian diffuser 14. A Lambertian diffuser is preferred to replicate to laser pulse because it serves to uniformly distribute the pulse power. A linear array of fiber optics 1-1 to 1-n of varying fiber lengths L-1 to L-n is arranged along an arc of uniform response and are responsive to and transmit the replicated pulses. The fiber lengths are incrementally increased such that each sequential fiber has a distance increase $\Delta L$ which no longer than the pulse width $\lambda$ of the pulse being measured.

The total distance $\Delta$ in FIG. 1 is equal to MX$\Delta$L. Typically n is between 60 and 100 fibers, with 30 fibers being a minimum. The fibers are directly coupled to a detector 18.

Figure 3:
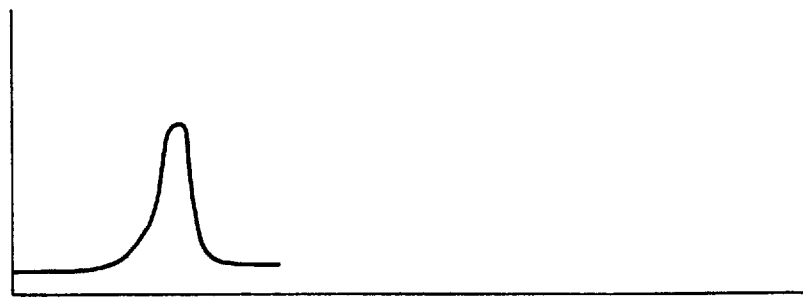
FIGS. 3, 4 and 5 are schematic illustrations of waveforms of signals occurring in the systems shown in FIG. 1 and FIG. 2.

The detector 18 will produce n pulses having a pulse width $\lambda$, each separated in time by a given time delay $\Delta t$ which is directly proportioned to the increase in length of $\Delta L$ of each fiber as shown in FIG. 3. Detector 18 may be a single element PIN photodiode fabricated in silicon or InGaAs. Since electronic noise present on the pulse signals caused by electromagnetic interference will be generally random, whereas the signal is constant, the actual pulse shape can be extracted by averaging n times on the same, i.e., single pulse. The output of the photodiode detector 18 may be fed directly to a digitizing oscilloscope 26 which would perform the pulse digitizing function. Presently available oscilloscopes can collect in memory several pulses and average the collected data to produce a digitized average pulse shape output.

Figure 4:
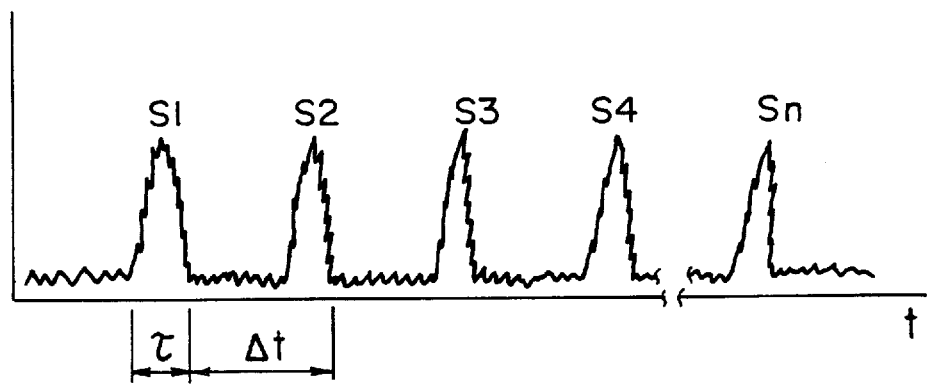

Referring to FIG. 3, an incipient original single pulse $S_1$ from laser 10 of FIG. 1 is shown. FIG. 4 illustrates a series of pulses $S_1$ to Sn, the output of photodetector 18 of FIG. 1 which is the pulse SI of FIG. 1 replicated n times by the fibers 16-1 through 16-n in FIG. 1.

Figure 5:
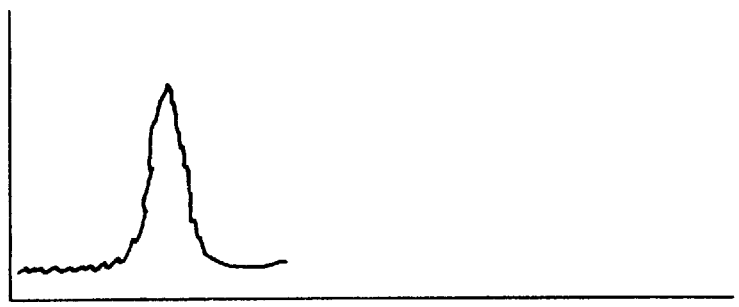

FIG. 5 shows the resultant output pulse after (n) pulse averaging by the oscilloscope.

In FIG. 3, the pulse width may be, for example, 20 nanoseconds and the time delay induced by the increased fiber length ($\Delta L$) between pulses may be, for example, 150 nanoseconds and therefore the signal strength of each of the signal pulses S1, S2, S3, S4 . . Sn are approximately equal. Since the signal strengths of each of the n pulses are approximately equal yet the noise is random, the n pulses can be averaged to produce a $1/\sqrt{n}$ noise reduction.

Figure 2:
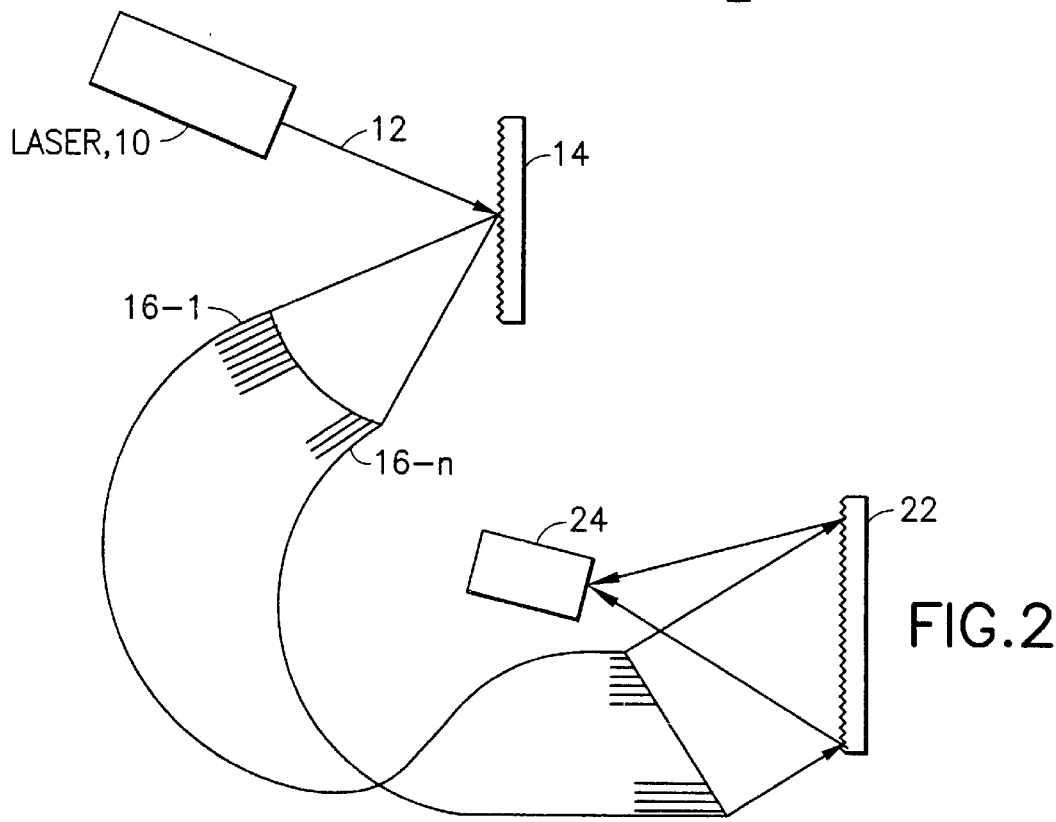
FIG. 2 is a schematic illustration of another embodiment of the system of FIG. 1.

FIG. 2 illustrates an alternate scheme for obtaining the output pulses from the fibers 16-1 through 16-n. The embodiment of FIG. 3 is the same as that of FIG. 1 except that the pulses from the ends of the fibers 16-1 through 16-n are reflected off a second diffuser 22 onto detector 24.

We claim:

1. A system for measuring the peak power of pulses from a laser source comprising:

a source of laser pulses, means responsive to at least one laser pulse to replicate said at least one pulse n times to provide n pulses;

a plurality of n optical fibers connected to said means to replicate for separately transmitting each one of said n pulses wherein said n optical fibers are of varying length by an amount $\Delta L$ from L-1 to L-n, said means for detecting each of said n pulses to produce a sequence of pulses separated in time by $\Delta t$ wherein $\Delta t$ is directly proportional to Al.

2. A system according to claim 1 further including a digitizing means connected to said detecting means for digitizing said sequence of time separated pulses.

3. A system according to claim 1 wherein said replicating means is an optical diffuser.

4. A system according to claim 1 wherein said detecting means is photodector means.

5. A system according to claim 2 wherein said digitizing means is a digitizing oscilloscope.

* * * * *